(12) United States Patent
Domprobst

(10) Patent No.: US 11,951,773 B2
(45) Date of Patent: Apr. 9, 2024

(54) TREAD COMPRISING INTERRUPTED GROOVES

(71) Applicant: COMPAGNIE GENERALE DES ETABLISSEMENTS MICHELIN, Clermont-Ferrand (FR)

(72) Inventor: Frédéric Domprobst, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 413 days.

(21) Appl. No.: 17/416,004

(22) PCT Filed: Dec. 11, 2019

(86) PCT No.: PCT/FR2019/053024
§ 371 (c)(1),
(2) Date: Jun. 18, 2021

(87) PCT Pub. No.: WO2020/128237
PCT Pub. Date: Jun. 25, 2020

(65) Prior Publication Data
US 2022/0048336 A1    Feb. 17, 2022

(30) Foreign Application Priority Data

Dec. 19, 2018 (FR) .................................. 1873352
Jan. 30, 2019 (FR) .................................. 1900868

(51) Int. Cl.
*B60C 11/117* (2006.01)
*B60C 11/03* (2006.01)
(Continued)

(52) U.S. Cl.
CPC ........ *B60C 11/0323* (2013.01); *B60C 11/032* (2013.01); *B60C 11/1236* (2013.01); *B60C 11/1281* (2013.01); *B60C 2200/06* (2013.01)

(58) Field of Classification Search
CPC ............... B60C 11/032; B60C 11/0323; B60C 11/1281
See application file for complete search history.

(56) References Cited

U.S. PATENT DOCUMENTS

2009/0165908 A1*  7/2009  Takahashi ............... B60C 11/04
                                                             152/209.18

FOREIGN PATENT DOCUMENTS

EP    2 011 671    1/2009
EP    2 379 352    12/2009
(Continued)

OTHER PUBLICATIONS

Machine Translation: JP-62241712-A, Matsushita T, (Year: 2023).*

*Primary Examiner* — Kendra Ly
(74) *Attorney, Agent, or Firm* — Cozen O'Connor

(57) ABSTRACT

Tread (1) for a tire of a heavy-duty vehicle, having a tread surface (10), this tread (1) comprising, near to each of its edges (11), a plurality of open wells (2) on the tread surface when new, these open wells (2) of depth Pmax being arranged circumferentially with a mean distance D between two consecutive open wells; each open well (2) being delimited by two main faces (21, 22) facing one another, this tread being such that each open well (2) is connected to at least one hidden cavity (32) formed within the tread, this hidden cavity (32) opening into a main face (21, 22) of said well.

11 Claims, 3 Drawing Sheets

(51) Int. Cl.
   *B60C 11/12*         (2006.01)
   *B60C 11/13*         (2006.01)

(56)         References Cited

FOREIGN PATENT DOCUMENTS

| | | | | |
|---|---|---|---|---|
| EP | 2 483 087 | | 9/2010 | |
| EP | 2 323 858 | | 5/2011 | |
| EP | 2 962 872 | | 1/2016 | |
| JP | 62029905 U | * | 2/1987 | |
| JP | 62241712 A | * | 10/1987 | ......... B60C 11/0323 |
| JP | 2008 213596 | | 9/2008 | |

* cited by examiner

TREAD COMPRISING INTERRUPTED GROOVES

RELATED APPLICATIONS

This is a U.S. National Phase Application under 35 USC 371 of International Application PCT/FR2019/053024 filed on Dec. 11, 2019.

This application claims the priority of French application nos. FR 18/73352 filed Dec. 19, 2018 and FR 19/00868 filed Jan. 30, 2019, the entire content of all of which are hereby incorporated by reference.

FIELD OF THE INVENTION

The invention relates to treads for heavy-duty vehicle tires and more particularly to the arrangements of voids with which these treads are provided, and thanks to which the performance in terms of the ability to drain away water present on the road surface in times of wet weather is longer-lasting, and the running performance is improved.

DEFINITIONS

A cut means any cavity or void produced in particular by moulding in a tread for a tire, a cut extending both into the depth of the tread and in a main direction—which is the direction in which water flows in the cut when running in times of wet weather. This main direction corresponds to the greatest dimension of the cut on the tread surface.

An open groove means a cut that opens onto a tread surface of a tread that comes into contact with the road surface, this groove being delimited by facing walls, the mean distance between these walls being appropriate for these walls not to be in contact with one another under normal conditions of use of the tire.

A sipe means a thin cut having a small mean width, this mean width corresponding to the mean distance separating the facing walls that delimit it, and such that, under normal conditions of use of the tire, these walls can come, at least partially, into contact with one another when entering the contact patch in which the tire is in contact with the road surface.

A hidden cavity means a cavity that is formed under the tread surface in the new state of the tread, this cavity being able to be intended to form a new groove that opens onto the new tread surface created after a predetermined amount of partial wear. A hidden cavity is delimited by two facing main walls, these two main walls being connected to one another by a lower part forming a bottom and by an upper part that continues these main walls radially towards the outside. A sipe may open into this upper part to connect the hidden cavity to the tread surface in the new state. Viewed in cross section, a hidden cavity may adopt any geometric shape, for example: circular, rectangular, triangular.

The thickness of tread material to be worn away means the thickness of this tread material that can be worn away during running before the legal tread wear limit is reached, this limit being able to be identified by tread-wear indicators formed in particular in the grooves. When this limit has been reached, intervention is necessary in order to reform a new design of voids on the tread of the tire, to fit a new tread or to change the tire.

In the present description, the terms radial or radially are used to indicate a direction which, when considered on the tire, is a direction perpendicular to the axis of rotation of the tire whereas, when considered on a tread alone, it corresponds to the direction of the thickness of said tread.

Moreover, the term circumferential is used to indicate a direction which corresponds to a direction tangential to any circle centred on the axis of rotation of the tire. This circumferential direction corresponds to the longitudinal direction of the tread when the latter is made in the form of a flat strip before it is incorporated into the manufacture of a new tire or the retreading of a worn tire.

The term transverse refers to a direction that is parallel to the direction of the axis of rotation of the tire. This direction is perpendicular to the radial direction and to the circumferential direction. A direction is said to be oblique when it forms an angle greater than zero with the circumferential or longitudinal direction on a tread.

BACKGROUND OF THE INVENTION

As is known, wet-weather driving conditions require the most rapid possible elimination of the water between the tread of each tire and the road surface so as to ensure that the material of the tread makes contact with the road surface. The water which is not pushed ahead of or to the sides of the tire partially enters and flows in cuts formed in the tread, these cuts taking the form of cavities which, when new, open onto the tread surface of the tread. These cavities can be oriented in the circumferential direction or the transverse direction or else in an oblique direction that is somewhere between the previous two directions, or else in a combination of these directions. What is meant by the orientation of a cavity is the angle that its longest dimension on the tread surface makes with, for example, the circumferential direction on the tire.

Whatever the category of tire, the tread of this tire needs to afford a water drainage performance that is always above a minimum performance level known as the safe performance level. Accordingly, and given that the tread gradually wears away, progressively reducing the cross-sectional areas of the grooves and the ability of these grooves to drain away a given quantity of liquid, it is commonplace to produce grooves that open onto the tread surface in the new state and continue into the thickness of the tread down to at least a level that corresponds to a legal wear limit requiring the tread to be withdrawn.

However, the disadvantage of creating such a plurality of grooves that open onto the tread surface of a tread is that it reduces the amount of material for a given width of tread and consequently appreciably reduces the stiffness of the tread, this having an impact on the wearing performance. As a result, in order to address the loadings experienced by the tread during running, a person skilled in the art needs to compensate for these reductions in stiffness by any means at their disposal, notably by adapting the internal structure of the tire, something that is, of course, not without its own impact on the manufacturing cost of the tire itself. These reductions in stiffness can also adversely affect the wear rate, the evenness of this wear, and some of the expected performance aspects during running.

Furthermore, an increase in the rolling resistance, that is to say an increase in the dissipation of energy with each revolution of the wheel is observed, this dissipation being connected with the greater deformations experienced by the elastomer materials that form the tread, this manifesting itself in an appreciable increase in the fuel consumption of the vehicles fitted with such tires.

In order to at least partially solve such a problem, document EP 2323858-B1 proposes forming both grooves and, entirely under the tread surface of the tread in the new state, hidden cavities, each hidden cavity, forming a channel, being continued towards the tread surface of the tread in the new state by a sipe of appropriate geometry for promoting greater stiffness. With this type of tire it is possible to renew a greater or lesser proportion of the initial drainage volume of the grooves once the tread has reached a predetermined level of wear.

It is also known practice to form what has been described as wavy grooves (EP2483087 B1) in the thickness of a tread, these grooves having parts open onto the tread surface when new and parts hidden in the thickness of the tread, these parts being connected to one another by intermediate parts. To facilitate moulding and demoulding, a sipe is formed to connect the hidden and intermediate parts to the tread surface when new. This arrangement of grooves is of course favourable from the viewpoint of limiting the reduction in stiffness associated with the presence of voids in the tread. However, beyond a certain degree of partial wear, the intermediate parts and then the hidden parts alone are open onto the tread surface, discontinuously, and this may entail the presence of additional grooves that become active from a partial-wear situation onwards. These additional grooves may be the result of conversion of channels formed entirely within the tread.

It has also been proposed, notably in document EP 2379352 B1, that the hidden cavities be extended by a plurality of cavities that open both into a hidden cavity and onto the tread surface of the tread in the new state.

Although these provisions are favourable from a standpoint of balancing performance aspects, it has been found that certain running performance aspects are in need of further improvement. Such is the case regarding the mechanical strength of the edges of a tread for a heavy-duty vehicle tire. Specifically, the presence of a groove entirely open onto the tread surface in the vicinity of an edge of the tread may, under certain conditions of use, generate significant mechanical stresses in the bottom of the groove.

SUMMARY OF THE INVENTION

The present invention relates to a solution to this problem with the mechanical strength of the cuts near the edges of the tread, combined with that of reducing the energy loss in the tread for each revolution of the wheel.

To this end, one subject of the invention is a tread for a heavy-duty vehicle tire having a total thickness E corresponding to the total thickness of material to be worn away during running. This tread has, in the new state, a tread surface intended to come into contact with a road surface when a tire provided with this tread is running. This tread surface is renewed progressively with the wear caused by running on the road surface.

This tread comprises lateral edges axially delimiting a tread width.

This tread comprises, near each of its lateral edges:
a plurality of open wells opening onto the tread surface when new, these open wells of depth Pmax being arranged circumferentially with a mean distance D between two consecutive open wells; each open well being delimited by two main faces, the two main faces being connected to one another by a bottom, this bottom defining the depth of the well, each well having a maximum length of opening Lc measured in the circumferential direction and a transverse width La measuring the distance between the main faces, this width La being less than the maximum length of opening Lc,
this tread being characterized in that each open well is connected to at least one hidden cavity formed within the tread, this hidden cavity opening into a main face of said well.

By virtue of this arrangement, it is possible not to have a circumferential continuous groove near the edges and thus to maintain a relatively high level of tread stiffness when new one at the same time benefiting from an appropriate drainage volume that can be adjusted via the respective volumes of the open wells and of the hidden cavities. Of course, the hidden cavities may form additional transverse or oblique grooves and therefore further active edge corners in contact with the road surface, after a predetermined level of wear that causes these cavities to appear on the tread surface.

Advantageously, the open wells have, on the tread surface, an opening of elongate shape, the maximum length of opening Lc being at least equal to twice the smallest width dimension La, the latter being measured perpendicular to the maximum length of opening Lc.

In order to derive the greatest benefit from the drainage effect at the shoulders, it is sensible to plan for there to permanently be at least two open wells on the tread surface when new in the contact patch in contact with the road surface, this contact patch being obtained for the conditions of use of the tire provided with the tread according to the invention.

For lasting performance in running on a road surface covered with standing water right up until the tread is fully worn, the depth Pmax of the wells is greater than the thickness E of tread material to be worn away.

In an embodiment that simplifies the manufacture of the tread, a sipe open onto the tread surface when new extends as far as the hidden cavity of an open well and also opens onto said well.

In one embodiment of the invention, at least certain hidden cavities do not open to the outside of the tread, and in this case, the volume of each of said cavities is tailored to be sufficient to collect the water present on the road surface in the region of the edges of the tire when running on a road surface covered with standing water in wet weather. The volume of the collection of cavities connected to the wells moulded near to an edge is chosen to be a percentage of the difference between the volume of a circumferential continuous groove and the sum of the volumes of these wells. This percentage is at least equal to 0.25 and at most equal to 0.50.

In one embodiment, it is possible to provide more than one hidden cavity opening onto the one same well in order to have good drainage capability. In order to achieve optimal stiffness of the edge of a tread according to the invention, each hidden cavity is formed as close as possible to the bottom of the well into which it opens.

Advantageously, each hidden cavity has, starting from an open well, an elongate shape and is oriented in such a way as to make an angle at least equal to 30 degrees with the circumferential direction corresponding to the layout of the plurality of open wells on an edge of the tread.

Advantageously still, each hidden cavity connected to an open well that opens onto the tread surface when new opens onto a lateral face of the tread so as to allow the removal of liquid collected inside the open well to which this hidden cavity is connected. A lateral face of a tread corresponds to one of the two faces laterally extend the running face.

In the latter case, it is advantageous that two hidden cavities opening onto the outside are formed in such a way as to open onto a lateral face of the one same well, these hidden cavities being oriented in different ways so as to make the operation of these hidden cavities insensitive to the direction of rotation of the tire.

In a preferred embodiment, all the hidden cavities are formed on the one same side with respect to the plurality of wells formed axially close to the one same lateral edge of the tread.

In one embodiment, the tread is appropriate for conferring a preferred direction of rotation on the tire provided with this tread. This preferred direction is generally indicated on the tread or on the tire by a visual element or a marking such as an arrow, for example. In this specific embodiment, the hidden cavity or cavities connected to a well are oriented so as to promote the flow of the water present on a road surface towards the outside of the tread. Specifically, these hidden cavities are oriented in such a way that, viewed in projection onto the tread surface, that part of each hidden cavity that opens into the well is the first to come into contact with the road surface Thus a flow in the well will be diverted into the cavity at a shallow angle of less than 45 degrees to the circumferential direction.

In combination with any one of the arrangements described in the invention, it is possible to provide the presence of a sipe between the open wells axially close to the one same lateral edge of the tread, these sipes extending over part of the depth of the tread or else as far as the depth Pmax of said wells.

The invention also relates to a tire provided with a tread comprising on each of its lateral edges a plurality of open wells into which hidden cavities formed within the tread open, these hidden cavities either opening or not opening to the outside, as has just been described. The tread of this tire may, in combination, comprise traditional grooves and/or hidden channels intended to form additional grooves when a predetermined degree of partial wear is reached. In such instances, causing the hidden cavities connected to the open wells to open into these hidden grooves or hidden channels may be envisaged.

Further features and advantages of the invention will become apparent from the following description given with reference to the appended drawings, which show, by way of non-limiting examples, embodiments of the subject matter of the invention

DETAILED DESCRIPTION OF THE DRAWINGS

To make the figures easier to understand, identical reference signs have been used to describe variants of the invention where these reference signs refer to elements of the same kind, whether in terms of structure or function.

Figure 1:
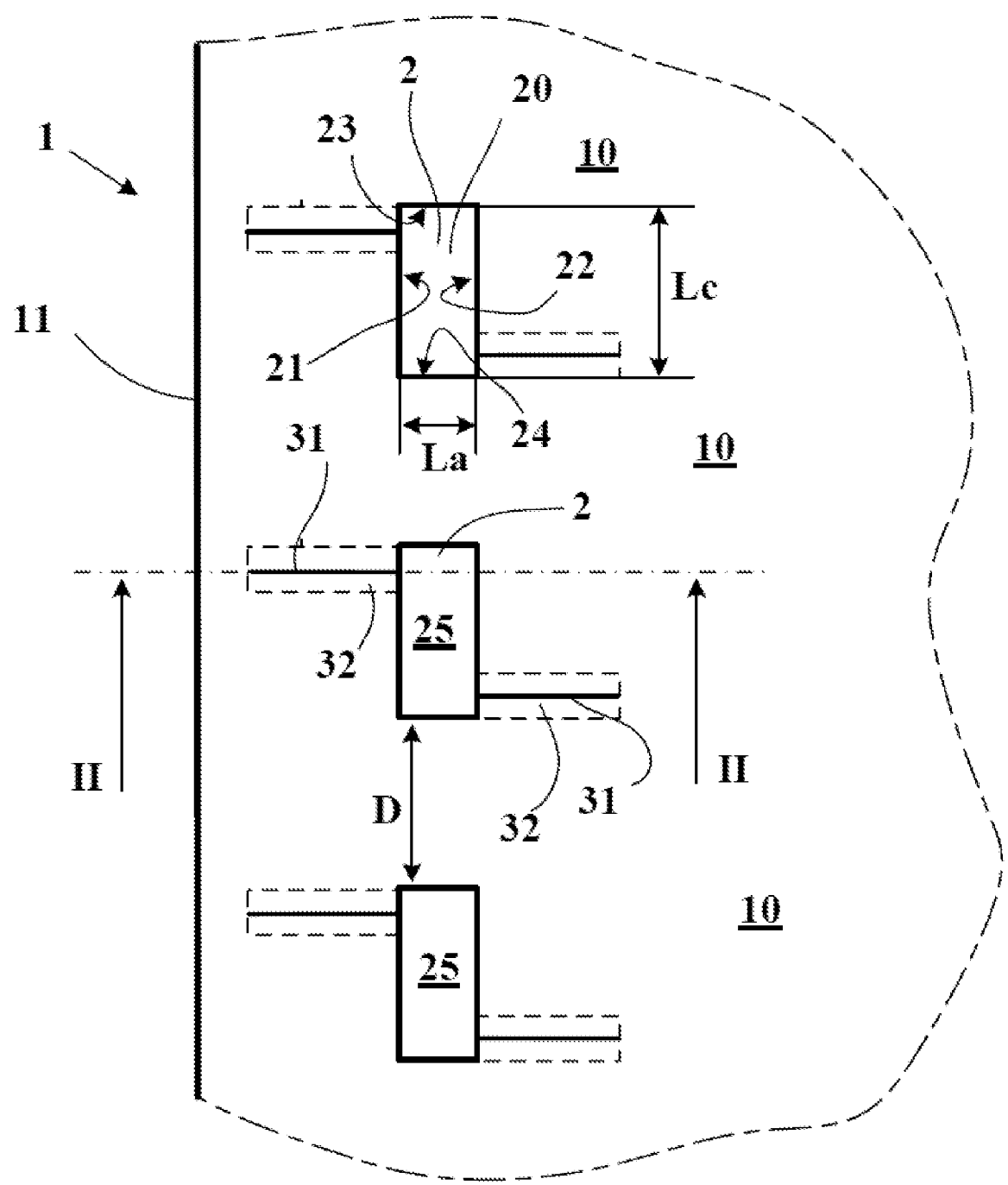
FIG. 1 shows a first variant of the arrangement of the open wells on a tread surface, these open wells being formed near a lateral edge of a tread.

FIG. 1 shows a first variant of the arrangement of the open wells on a tread surface, these open wells being formed near a lateral edge of a tread.

This FIG. 1 shows a partial view of a tread 1 of a tire for a heavy-duty vehicle having a tread surface 10 when new that is intended to come into contact with a road surface during running. The partial view of FIG. 1 shows a lateral edge 11 of this tread.

Near to this lateral edge 11 are formed a plurality of open wells 2 opening onto the tread surface 10 when new. These open wells 2 are arranged in a circumferential direction with a distance D between two wells. Each of these open wells 2 has an opening 20 onto the tread surface, this opening 20, in the example described, having a rectangular shape with a maximum length of opening Lc and a width La. For the tire of the example, of size 315/70R22.5, the length Lc measures 25 mm and the width La measures 10 mm, the distance D measures 30 mm. The dimensions: maximum length of opening Lc, and distance D between two wells, are determined so that there are permanently at least two open wells 2 present in the contact patch in contact with the road surface under the conditions of use.

Each open well 2 is delimited in the thickness of the tread 1 by main faces 21, 22, these main faces comprising end faces 23, 24. The main faces being connected to one another by a bottom 25. This bottom 25 is at a distance Pmax from the tread surface 10 when new and, in this particular instance, this distance Pmax is greater than the thickness T of material to be worn away during running so as to maintain the presence of a void until the tread is fully worn.

In addition, there is formed, within the tread and close to each end face 23, 24 of each open well 2, a hidden cavity 32 that opens into one of the main faces 21, 22 delimiting this well 2. Surmounting each of these hidden cavities 32 there is formed a sipe 31 opening both onto the tread surface 10 and into one of the main faces 21, 22 delimiting the open well 2.

Figure 2:
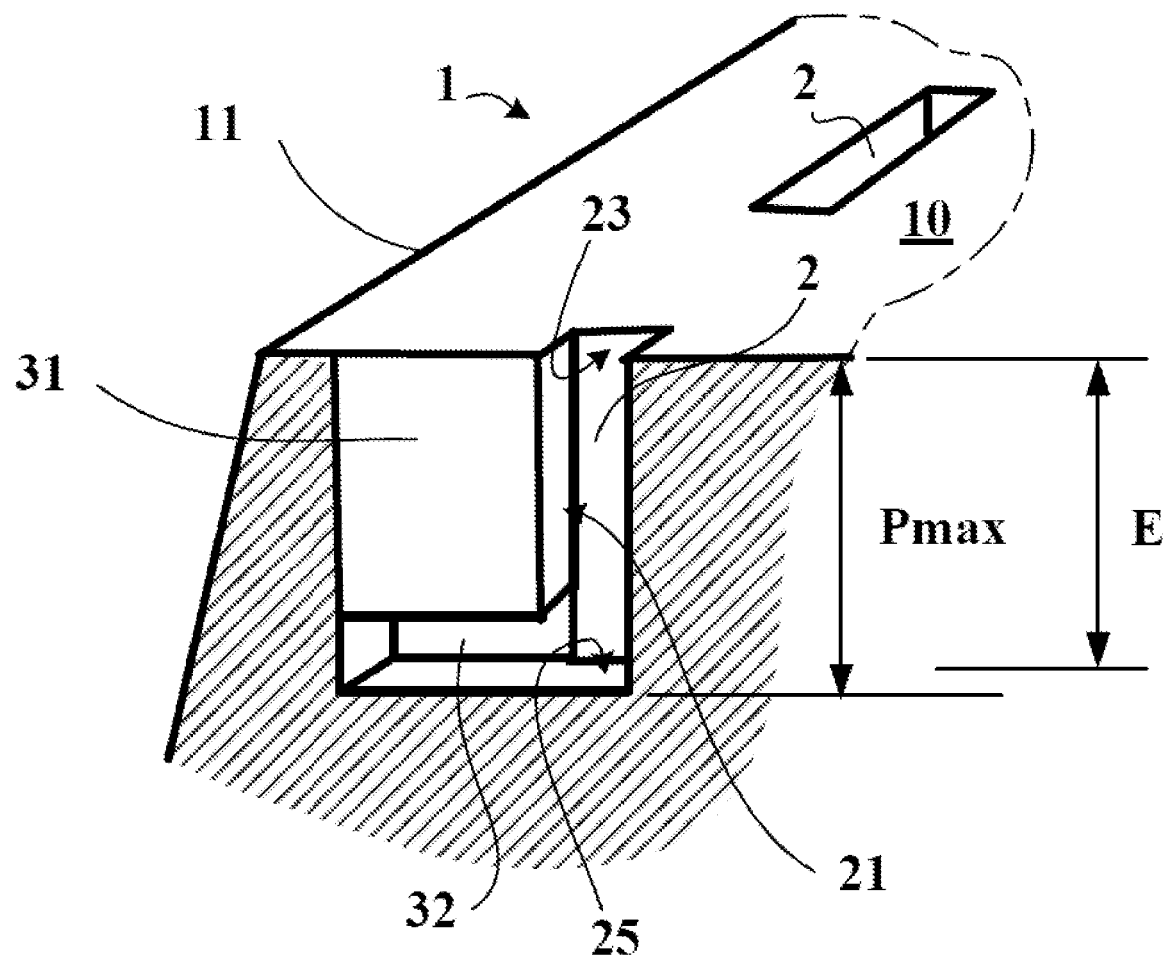
FIG. 2 shows, in transverse section (on II-II), the variant shown in FIG. 1 in the new state.

These hidden cavities 32 do not open to the outside of the tread, notably to the lateral parts of the tread as is best visible in FIG. 2 which shows, in transverse section, the variant shown in FIG. 1, when new.

In this FIG. 2 it may be seen that a hidden cavity 32 opens into the well 2 as close as possible to the bottom 25 of said well so as to generate additional drainage volume that adds to that of the open well, thus compensating for the fact that the tread has no circumferential and continuous open groove near its lateral edges.

This additional volume is smaller than the missing volume of groove in the initial state: this is because those skilled in the art know that, with a groove, it is necessary to provide a volume that is greater than necessary when new because it is necessary to take account of the wearing of the tread and of the progressive reduction of the volume available in the groove. With the present invention, it is possible to better tailor the total void volume (including the volume of the open wells and that of the hidden cavities connected to the wells).

Furthermore, each hidden cavity 32 generates a new transverse groove when the tread becomes partially worn, this transverse groove being useful in the final phase of wear of the tread.

Figure 3:
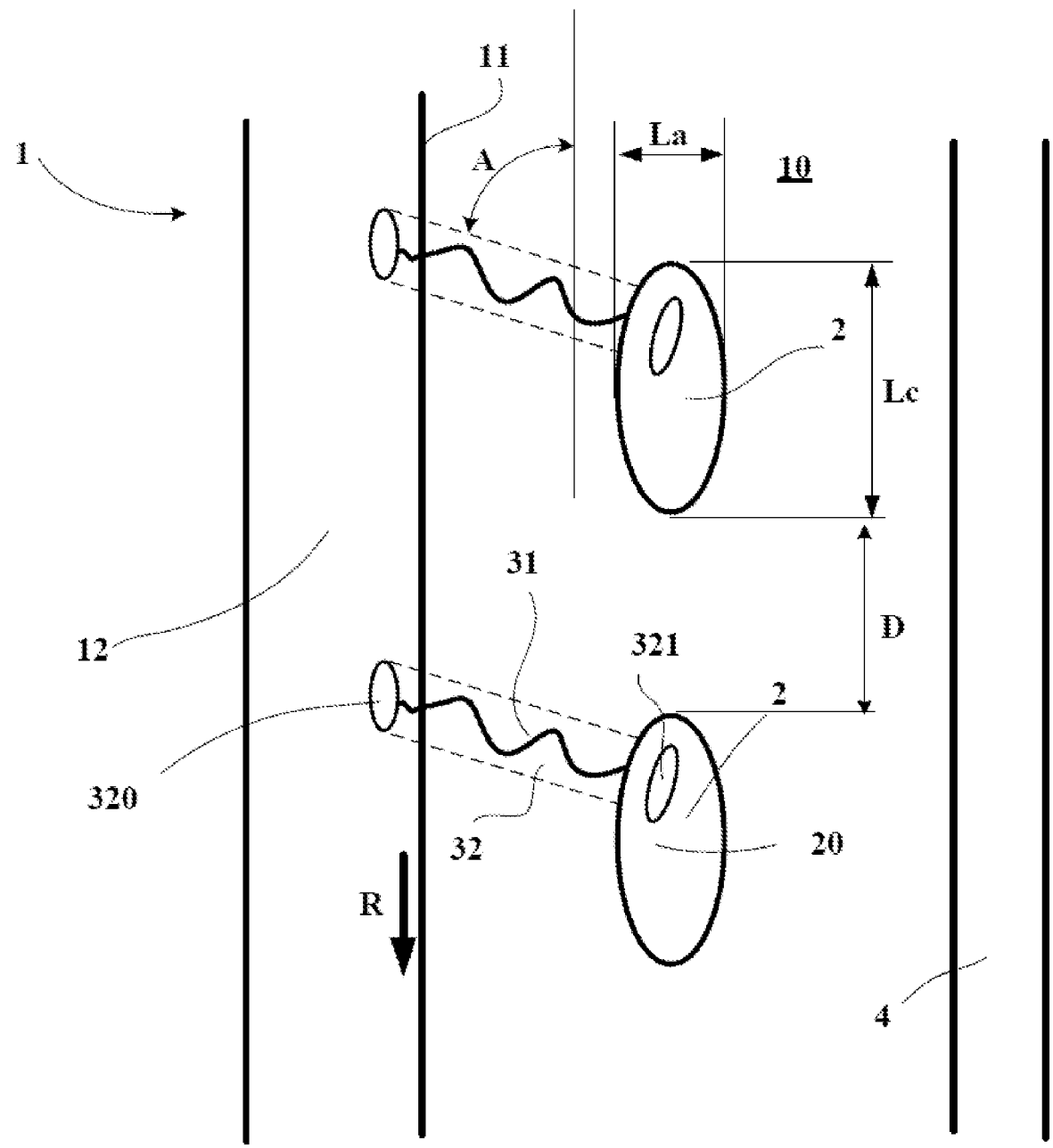
FIG. 3 shows a second variant of the arrangement of the open wells formed near a lateral edge of a tread having features implying a preferred direction of use when fitted to a tire.

FIG. 3 shows a second variant of shape and layout of the open wells 2 formed near a lateral edge of a tread having inherent characteristics that imply a preferential direction of use when fitted to a tire (this direction is identified in the figure by an arrow R). This preferred direction is, as a general rule, indicated on the tire by a specific sign visible to the user.

In such a case, it is advantageous to orient the hidden cavities 32 in such a way as to make best use of this preferred direction of rotation. The scenario described shows open wells 2 having, on the tread surface 10 when new, an opening 20 of oblong shape of which the longer of the dimensions, denoted Lc, is measured in the circumferential direction. Near the bottom 25 of each of the open wells 2, a hidden cavity 32 opens at one of its ends via an opening 321 into the well 2, this hidden cavity 32 opening at its other end onto one of the lateral faces 12 of the tread via an opening 320 (each lateral face 12 intersecting the tread surface 10 to form an edge 11 of the tread). The presence of this opening 320 means that the volume of each hidden cavity can be reduced even further to the bare minimum required to accomplish the drainage and removal of the water present on the edge of the tread on contact with a road surface covered with water.

Each of the hidden cavities 32 makes a mean angle A with the circumferential direction equal in this instance to 30 degrees with the circumferential direction. The sipes 31 formed between the tread surface and the hidden cavities are oriented overall at the same angle A. In the scenario depicted, these sipes have a wavy geometry, both at the surface and within the depth of the tread.

The angle A of each hidden cavity is suitable for promoting the flow of the water present on a road surface towards the outside of the tread. Specifically, the hidden cavities 32 are oriented in such a way that, viewed in projection onto the tread surface, the projected part of the opening 321 of each hidden cavity into the well is the first to come into contact with the road surface This layout is favourable when tread wear reaches an extent such that the hidden cavity generates a new groove.

The main direction of the hidden cavity corresponds to the lengthwise direction of the hidden cavity along which a flow of water becomes established when running on a road surface covered in water.

A circumferential groove 4 is depicted to the right in FIG. 3, and in this instance flanks the interior side of the shoulder rib in which the open wells and the hidden cavities are situated. In this variant as in the previous one, it may be seen that there is no circumferential continuous groove axially between the edges of the tread and said wells.

Of course, the different variants described can be combined with one another, according to the desired objective.

The invention is not restricted to the two examples described and various modifications can be made thereto without departing from its scope as defined in the claims. In particular, a sipe of suitable geometry may be provided to extend from one open well to another open well, this sipe opening onto the tread surface.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread for a tire of a heavy-duty vehicle, comprising:
a tread surface when new that is intended to come into contact with a road surface when the tire provided with this tread is being driven on, this tread comprising:
   edges axially delimiting a tread width;
   a plurality of open wells on the tread surface when new near to each of the edges, these open wells of depth Pmax being arranged circumferentially;
   each open well being delimited by a first main face and a second main face facing each other and connected by a well bottom, this bottom defining the depth Pmax of the well,
   each open well having a maximum length of opening Lc measured in the circumferential direction on the tread surface and a transverse width La measuring the distance between the main faces, this width La being less than the circumferential maximum length of opening Lc, and
   each open well is connected to a first axially extending hidden cavity formed within the tread, the first hidden cavity opening into the first main face of said well at a first circumferential end of the open well, and
   each open well is connected to a second axially extending hidden cavity formed within the tread, the second hidden cavity opening into the second main face of said well at a second circumferential end of the open well opposite the first end.

2. The tread according to claim 1, wherein the open wells have, on the tread surface, an opening of elongate shape, the circumferential maximum length of opening Lc being at least equal to twice the transverse width La.

3. The tread according to claim 1, wherein there are permanently at least two open wells on the tread surface when new in the contact patch in contact with the road surface, this contact patch being obtained for the conditions of use of the tire provided with this tread.

4. The tread according to claim 1, wherein a sipe open onto the tread surface when new extends as far as the hidden cavity of an open well and also opens onto said well.

5. The tread according to claim 1, wherein each hidden cavity is formed as close as possible to the bottom of the well into which it opens.

6. The tread according to claim 1, wherein each hidden cavity has, starting from an open well, an elongate shape and is oriented in such a way as to make a mean angle A at least equal to 30 degrees with the longitudinal direction.

7. The tread according to claim 1, wherein each hidden cavity connected to an open well opening on the tread surface when new opens onto a lateral face of the tread so as to allow the removal of liquid collected inside said open well.

8. The tread according to claim 1, wherein the tread has a direction of rotation, and wherein the hidden cavity or cavities connected to an open well are oriented in such a way that, when viewed in projection onto the tread surface, that part of each hidden cavity that opens into the well is the first to come into contact with the road surface.

9. The tread according to claim 1, wherein this tread has no continuous circumferential groove between the plurality of wells and their axially nearest edge.

10. A tire for a heavy-duty vehicle provided with a tread according to claim 1.

11. A tread fora tire of a heavy-duty vehicle, comprising:
a tread surface when new that is intended to come into contact with a road surface when the tire provided with this tread is being driven on, this tread comprising:
   edges axially delimiting a tread width;
   a plurality of open wells on the tread surface when new near to each of the edges, these open wells of depth Pmax being arranged circumferentially;
   each open well being delimited by two main faces connected by a well bottom, this bottom defining the depth Pmax of the well, each open well having a maximum length of opening Lc measured in the circumferential direction on the tread surface and a transverse width La measuring the distance between the main faces, this width La being less than the circumferential maximum length of opening Lc, and each open well is connected to a first axially extending hidden cavity formed within the tread, the first hidden cavity opening into a main face of said well at a first circumferential end of the open well, and each open well is connected to a second axially extending hidden cavity formed within the tread, the second hidden cavity opening into a main face of said well at a second circumferential end of the open well opposite the first end, and the first axially extending hidden cavity and the second axially extending hidden cavity extend toward their axially nearest edge and is axially terminated within the tread.

* * * * *